March 25, 1958   H. C. HUNT   2,827,990
SEWING MACHINE PULLEY CONSTRUCTION
Filed Jan. 17, 1956

INVENTOR.
HARRY C. HUNT
BY
*Lea Edelson*
ATTORNEY.

United States Patent Office 2,827,990
Patented Mar. 25, 1958

2,827,990

SEWING MACHINE PULLEY CONSTRUCTION

Harry C. Hunt, Reading, Pa., assignor to American Safety Table Company, Inc., Reading, Pa., a corporation of Pennsylvania Application January 17, 1956, Serial No. 559,641

5 Claims. (Cl. 192—18)

This invention relates generally to apparatus for the transmission of power from a continuously operated motor to a sewing machine or other intermittently operated utility, and particularly to improved means for maintaining the apparatus free from harmful deposits of airborne dirt or lint.

The apparatus embodying the present invention essentially comprises an electric motor that is equipped with a pulley or flywheel, a revoluble combination clutch and brake mechanism axially shiftable as a unit in one direction for clutching the motor pulley or flywheel to thereby drive the utility and axially shiftable as a unit in the opposite direction for engagement with a brake element to thereby arrest or brake the operation of the utility, and hollow stationary means for mounting the clutch and brake unit in the manner aforesaid.

A principal object of the present invention is to provide the apparatus of the present invention with means for effectively guarding the interior of the hollow stationary means aforesaid against harmful deposits of airborne dirt or lint.

Other objects and advantages of the present invention will appear more fully hereinafter, it being understood that the invention consists substantially in the combination, construction, location and relative arrangement of parts, all as described in detail hereinafter, as shown in the accompanying drawing, and as finally pointed out in the appended claims.

Figure 1:
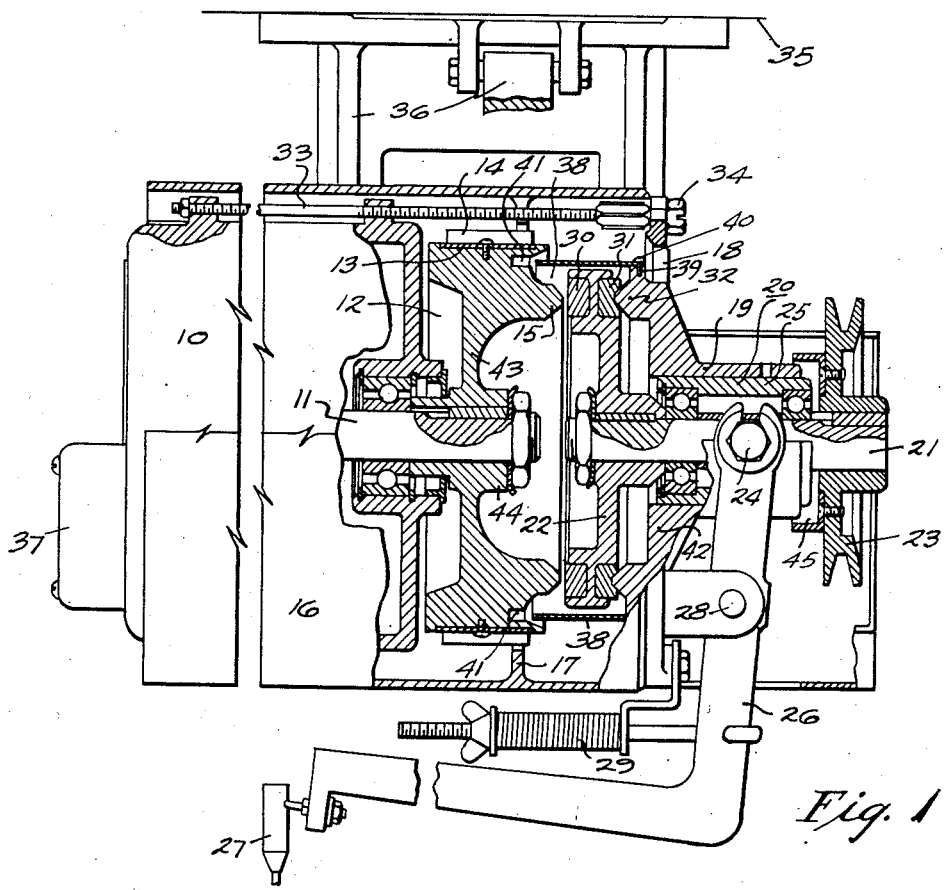
Figure 2:
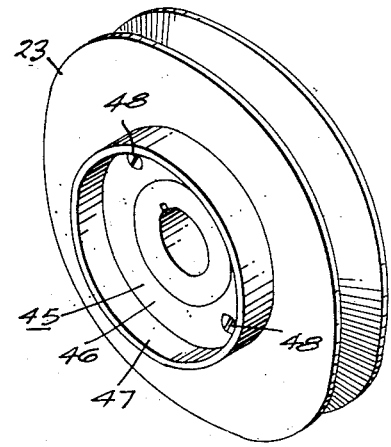

In the accompanying drawings, which illustrate apparatus constructed in accordance with and embodying the general principles of the present invention:

Figure 1 is a side elevation, partly in section, of one form of apparatus embodying the present invention, the axially shiftable clutching and braking unit being shown declutched from the motor flywheel and engaged with the brake element; and Figure 2 is a perspective view of the belt pulley of the clutch and brake unit, shown alone.

The apparatus of the present invention is an improved form of the apparatus disclosed in copending application for United States Letters Patent filed by Harry C. Hunt on March 9, 1955, Serial No. 493,262, to which copending application reference may be had for all details of construction and operation not set forth hereinafter.

The apparatus of the present invention includes an electric motor 10 that has a shaft 11 which carries a flywheel 12. The latter is fitted with a collar 13 that mounts a series of vanes or impellers 14, and formed on one side of the flywheel 12 is an annular rib 15.

A motor housing 16 is provided internally with means (not shown) for concentrically mounting the motor 10 and the flywheel 12 and with an annular rib 17. In addition, the motor housing 16 is provided with means (not shown) for clamping the motor 10 in a selected position axially of the housing 16, with the flywheel 12 centered in the housing and free to rotate.

Suitably secured to the rear or flywheel end of the housing 16 is a centrally apertured end plate 18 that carries a rearwardly projecting cylindrical journal box 19. Slidably fitted within this journal box 19 is a ball-bearing assembly 20 within which is rotatably journalled a shaft 21 to the oppositely projected ends of which are respectively secured a clutch disc 22 and a belt pulley 23. The journal box or housing for the ball-bearing assembly is provided at diametrically opposite sides with openings (not shown) through which respectively project a pair of studs 24—24 suitably secured to diametrically opposite sides of the external sleeve 25 of the ball-bearing assembly. The clutch disc 22 and the belt pulley 23 are fixed to the shaft 21 for rotation therewith, and the clutch disc 22, belt pulley 23, shaft 21 and the ball-bearing assembly 20 are axially shiftable as a unit within the stationary journal box 19 through the medium of a bifurcated lever 26 that is secured to the unit by the studs 24—24 and which is operatively connected to a foot treadle (not shown) through the medium of a link 27, the lever 26 being rockable about a pivot 28 against the influence of a spring 29.

The clutch disc 22 is provided with a pair of annular friction discs 30—31, the disc 30 being adapted to engage the annular rib 15 of the motor flywheel 12 and the disc 31 being adapted to engage an annular rib 32 formed upon the inner face of the end plate 18. The motor 10 is provided with a bolt 33 that is threaded into a nut 34 which is axially fixed by and rotatable in the end plate 18. Adjustment of the motor 10 within the housing 16 to ensure accurate spacing between the rib 15 of the flywheel 12 and the rib 32 of the stationary end plate 18 is effected by manipulating the nut 34, it being understood, of course, that preliminarily to manipulating the nut 34 the means for clamping the motor in place is loosened.

The sewing machine or other utility (not shown) adapted to be driven by the power transmitting apparatus of the present invention is mounted upon a table designated 35, while the power transmitting apparatus is suspended below the table 35 by a bracket designated generally by the numeral 36. Suitable means, of which only the motor mounted receptacle 37 is shown, is provided for supplying the motor with electric power for continuous operation thereof, the clutch and brake unit being operable to translate the continuous operation of the motor and flywheel into intermittent operation of the sewing machine through the medium of a belt (not shown) suitably trained over the belt pulley 23.

For keeping air-borne dirt and lint from lodging between the flywheel 12 and the clutch disc 22 and/or between the latter and the end plate 18, and for preventing ingress thereof into the journal box 19 through the front end of the latter, an enclosure is provided for the clutch disc 22. This enclosure includes a cylindrical cover 38 which extends about the clutch disc 22 and axially between the flywheel 12 and the end plate 18. One end portion of the cover 38 is fitted over a radially extending annular flange 39 which is formed on the end plate 18 and which extends about the rib 32. The cover 38 is carried by the end plate 18, and, when secured thereto, as by studs designated 40, it is disposed concentrically relative to the clutch disc 22, which is adapted to rotate freely therewithin. The flywheel 12 is provided on the side thereof remote from the motor 10 with an annular groove 41 which extends about the rib 15 formed on the flywheel 12, this groove being adapted to freely receive the opposite end portion of the cover 38, as may be required when the motor and flywheel assembly are axially adjusted within the motor housing 16. The annular webs designated 42 and 43 extending radially respectively from the journal box 19 and from the hub 44 of the flywheel 12 are imperforate, and it will be apparent that the flywheel 12, end plate 18, and the cover 38 conjointly form a dirt and lint excluding enclosure for the clutch disc 22, effective to guard against excessive deposits of dirt and lint between the flywheel 12 and the clutch disc 22 and/or between the latter and the end plate 18 of the housing 16 and to additionally guard against ingress thereof into the journal box 19 through the front end thereof. It will be understood, of course, that the enclosure for the clutch disc 22 can be variously constructed. For example, the cover 38, instead of being made of imperforate sheet material, can be made of a suitably fine mesh wire fabric, instead of being carried by the end plate 18, can be carried by the flywheel 12, and instead of being made in one section, can be made in two sections carried respectively by the flywheel 12 and the end plate 18 of the housing 16.

For preventing ingress of air-borne dirt and lint into the journal box 19 through the rear end of the latter, the belt pulley 23 is provided with a cup shaped member 45 that has a centrally apertured bottom wall 46 and a rim 47. The bottom wall 46 is centrally apertured and fitted over a hub portion of the pulley 23, in side abutting relation to the web of the pulley 23, being secured to the latter by a pair of screws 48—48. The rim 47 is of an internal diameter sufficient for loosely receiving the associated terminal portion of the journal box 19 and extends axially of the pulley 23 a distance sufficient for telescopic engagement with the terminal portion aforesaid in any position thereof throughout the range of axial shifting movement of the clutch and brake unit. It will be understood, of course, that the means for guarding against ingress of air-borne dirt and lint into the journal box 19 through the rear end of the latter may be variously formed. For example, the rim 47 could be formed integral with the pulley 23. In addition, the end of the journal box 19 could be extended axially beyond the external sleeve 25 of the ball-bearing assembly 20 and the rim 47 fitted into this extended terminal portion of the journal box 19, or alternately the pulley 23 provided with an annular groove formed to suitably receive the extended terminal portion of the journal box 19.

It should be apparent that the journal box 19, either alone or conjointly with the cover 38, may be considered an elongated hollow stationary member provided with means at each of its opposite ends for guarding against ingress of air-borne dirt and lint into the interior thereof where harmful deposits might interfere with proper operation of the clutch and brake unit.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In an electric power transmission apparatus of the character described, an electric motor mounting a revoluble driving member, hollow stationary means extending axially outwardly from said driving member, a clutch mechanism including a shaft revolubly mounted in said stationary means and axially alined with said driving member, a clutch disc fixed on one end of said shaft and disposed in spaced close relation to said driving member, a pulley fixed on the opposite end of said shaft and disposed in axially spaced relation to the associated end of said stationary means, said clutch mechanism being axially shiftable as a unit toward said motor, cover means extending about said clutch disc and axially between said driving member and clutch disc, and means on said pulley axially overlapping the associated end of said stationary means throughout the range of movement of said clutch mechanism, said cover and last mentioned means being each operative to guard the interior of said hollow stationary means against the ingress of air-borne dirt and lint.

2. In an electric power transmission apparatus as defined in claim 1 wherein the pulley end of the stationary means and the means on said pulley overlapping the same are telescopically related.

3. In an electric power transmission apparatus as defined in claim 2 wherein the means on the pulley overlapping the pulley end of the stationary means is of annular formation, and the pulley end of the stationary means is cylindrical.

4. In an electric power transmission apparatus as defined in claim 3 wherein the annular means on the pulley is an axially extending cylindrical element which embraces the cylindrical pulley end of the stationary means.

5. In an electric power transmission apparatus as defined in claim 4 wherein the axially extending cylindrical element that embraces the pulley end of the stationary means is the peripheral flange of a cup-shaped disc secured flatwise against one side face of said pulley.

References Cited in the file of this patent

UNITED STATES PATENTS

| | | |
|---|---|---|
| 931,651 | Rockstroh | Aug. 17, 1909 |
| 1,510,728 | Webb | Oct. 7, 1924 |
| 2,048,501 | Goosman | July 21, 1936 |
| 2,239,633 | Thompson et al. | Apr. 22, 1941 |

FOREIGN PATENTS

| | | |
|---|---|---|
| 454,671 | Canada | Feb. 15, 1949 |